(12) United States Patent
Pascznk

(10) Patent No.: US 7,290,776 B2
(45) Date of Patent: Nov. 6, 2007

(54) EXTENSION HANDLE APPARATUS FOR A WHEELED CHAIR

(76) Inventor: James J. Pascznk, 343 Columbian Ct., Vacaville, CA (US) 95687-7318

( * ) Notice: Subject to any disclaimer, the term of this patent is extended or adjusted under 35 U.S.C. 154(b) by 0 days.

(21) Appl. No.: 11/078,977

(22) Filed: Mar. 12, 2005

(65) Prior Publication Data

US 2006/0202440 A1    Sep. 14, 2006

(51) Int. Cl.
*B62B 3/02* (2006.01)

(52) U.S. Cl. ............... 280/47.371; 280/655; 403/385; 403/396

(58) Field of Classification Search ........... 280/47.371, 280/655; 135/67; 403/389, 390, 385, 396
See application file for complete search history.

(56) References Cited

U.S. PATENT DOCUMENTS

| 945,451 | A | * | 1/1910 | Glass ................... 243/72.5 |
| 1,001,240 | A | | 8/1911 | Beers |
| 1,441,144 | A | * | 1/1923 | Cutler ................... 56/249 |
| 3,010,731 | A | | 11/1961 | Kenney |
| 3,084,949 | A | | 4/1963 | Forster et al. |
| 4,435,880 | A | * | 3/1984 | Gardner .................. 24/66.3 |
| 4,536,102 | A | * | 8/1985 | Doyle ................... 403/390 |
| 4,762,331 | A | | 8/1988 | Tucker et al. |
| 4,799,641 | A | * | 1/1989 | Koreski ................ 248/68.1 |
| 4,917,392 | A | * | 4/1990 | Ambasz .................. 280/40 |
| 5,349,977 | A | * | 9/1994 | Wood ..................... 135/67 |
| 5,593,205 | A | * | 1/1997 | Vanderminden et al. ............... 297/184.15 |
| 5,625,923 | A | | 5/1997 | Huang |
| 5,794,307 | A | * | 8/1998 | Overcash et al. ........... 16/427 |
| 6,098,492 | A | * | 8/2000 | Juchniewicz et al. ...... 74/551.3 |
| 6,435,565 | B2 | * | 8/2002 | Potts et al. ............. 285/124.1 |
| 6,453,921 | B1 | * | 9/2002 | Rost ...................... 135/67 |

FOREIGN PATENT DOCUMENTS

DE    4022394 A1 *    1/1992

* cited by examiner

*Primary Examiner*—Christopher Bottorff
*Assistant Examiner*—John D Walters

(57) ABSTRACT

An extension handle apparatus is provided for a wheeled chair which includes handle support tubes for supporting one or more wheeled-chair handles. The extension handle apparatus includes an extension support portion and an extension handle portion connected to the extension support portion. A pair of clamping plates are provided, wherein each clamping plate includes an extension-support reception region and a wheeled-chair-handle-support-tube reception region. Clamping fasteners are connected between the clamping plates, and a retention assembly is connected between the clamping plates for retaining the clamping plates in opposite positions with respect to each other. The wheeled-chair handles are a fixed distance from the wheeled chair. By using retrofitted extension handle apparatuses of the invention attached to the handle support tubes on the wheeled chair, the effective distance of extension handle portions from the wheeled chair can be adjusted as desired.

9 Claims, 3 Drawing Sheets

EXTENSION HANDLE APPARATUS FOR A WHEELED CHAIR

BACKGROUND OF THE INVENTION

1. Field of the Invention

The present invention relates generally to handles for wheeled chairs, and, more particularly, to length-adjustable handles for wheeled chairs.

2. Description of the Prior Art

Wheeled chairs, such as baby strollers and wheelchairs, generally have a pair of handles that are supported by metal support tubes. Generally, the metal support tubes have a fixed length, and the handles are fixed onto the ends of the fixed metal support tubes. As a result, a person pushing the wheeled chair must accommodate oneself to the fixed handles. This can be a problem, especially for people who are relatively short or relatively tall, or who have relatively short arms or relatively long arms. In this respect, such persons may be uncomfortable or have to undesirably strains oneself to push such wheeled chairs with such fixed handles. In this respect, it would be desirable if a handle apparatus were provided for a wheeled chair that is adjustable to accommodate users having different heights and having different lengths of arms.

Throughout the years, a number of innovations have been developed relating to handles for wheeled chairs, and the following U.S. patents are representative of some of those innovations: U.S. Pat. Nos. 1,001,240, 3,010,731, 3,084,949, 4,762,331, and 5,625,923.

More specifically, U.S. Pat. No. 3,010,731 discloses a baby stroller that has a handle which is retractable to a lowered position when the stroller is not in use and which is extensible to a raised position when the handle is in use. Once the handle is in the raised position, the handle is not adjustable. In this respect, it would be desirable if a handle apparatus were provided for a wheeled chair wherein the handle is retractable and extensible and is adjustable to accommodate users having different heights and having different lengths of arms.

U.S. Pat. No. 3,084,949 discloses a folding stroller that has a telescopic handle. It is clear from a reading of this patent that the folding stroller and the telescopic handle must be manufactured as such. However, in the marketplace, there are many strollers and other wheeled chairs that have not been manufactured with telescopic handles. In this respect, it would be desirable if a handle apparatus were provided for a wheeled chair that can be retrofitted to a wheeled chair that does not have telescopic handles.

U.S. Pat. No. 4,762,331 discloses a combination automobile seat and stroller which has a telescopic handle. It is clear from a reading of this patent that the telescopic handle must be manufactured as part of the combination automobile seat and stroller. However, as stated above, there are many strollers and other wheeled chairs that have not been manufactured with telescopic handles. As stated above, it would be desirable if a handle apparatus were provided for a wheeled chair that can be retrofitted to wheeled chairs that do not have telescopic handles.

U.S. Pat. No. 5,625,923 discloses a stroller that has a telescopic, length-adjustable handle. As described above, with respect to other prior art patents, the telescopic handle must be manufactured as part stroller. Also, as stated above, it would be desirable if a device were provided for retrofitting a wheeled chair that has not been manufactured with telescopic handles.

U.S. Pat. No. 1,001,240 may be of interest for its disclosure of a wheeled chair that has handles that are on fixed supports.

Still other features would be desirable in an extension handle apparatus for a wheeled chair. For example, some wheeled chairs have a pair of independent handles which are not connected together. Other wheeled chairs have a pair of handles that are connected together by a transverse or horizontal structural member. There are a wide variety of horizontal distances between independent handles in wheeled chairs. Therefore, if a device were provided for retrofitting a wide variety of wheeled chairs that have independent handles to have a transverse member connected between the independent handles, then such a retrofitting device should have a transverse member whose horizontal length is adjustable.

Thus, while the foregoing body of prior art indicates it to be well known to use length-adjustable handles for wheeled chairs, the prior art described above does not teach or suggest an extension handle apparatus for a wheeled chair which has the following combination of desirable features: (1) provides a handle for a wheeled chair that is adjustable to accommodate users having different heights and having different lengths of arms; (2) provides a handle for a wheeled chair wherein the handle is retractable and extensible; (3) provides a handle for a wheeled chair that can be retrofitted to a wheeled chair that does not have telescopic handles; and (4) provides a handle apparatus for retrofitting a wheeled chair that has independent handles to provide a horizontally adjustable transverse member connected between the independent handles. The foregoing desired characteristics are provided by the unique extension handle apparatus for a wheeled chair of the present invention as will be made apparent from the following description thereof. Other advantages of the present invention over the prior art also will be rendered evident.

SUMMARY OF THE INVENTION

To achieve the foregoing and other advantages, the present invention, briefly described, provides an extension handle apparatus for a wheeled chair which includes handle support tubes for supporting one or more wheeled-chair handles. The extension handle apparatus includes an extension support portion and an extension handle portion connected to the extension support portion. A pair of clamping plates are provided, wherein each clamping plate includes an extension-support reception region and a wheeled-chair-handle-support-tube reception region. Clamping fasteners are connected between the clamping plates, and a retention assembly is connected between the clamping plates for retaining the clamping plates in opposite positions with respect to each other. The wheeled-chair handles are a fixed distance from the wheeled chair. By using retrofitted extension handle apparatuses of the invention on the wheeled chair, the effective distance of extension handle portions from the wheeled chair can be adjusted as desired.

Preferably, the extension support portion and the extension handle portion are formed as a unified, integrated extension handle unit. Preferably, the clamping fasteners include bolts and wing nuts connected to the bolts.

Preferably, each of the extension-support reception region and the wheeled-chair-handle-support-tube reception region has a concave contour for receiving a convexly shaped structure. Generally, the handle support tubes and the extension support portions are convexly shaped structures. Preferably, resilient liners are located in the wheeled-chairhandle-support-tube reception regions of the clamping plates. If desired, a permanent fastener can be connected between one of the clamping plates and the extension support portion.

Preferably, the retention assembly includes a retention rod that is connected between the clamping plates. A bias spring is supported by the retention rod for maintaining the clamping plates in opposite positions with respect to each other when the clamping plates are not installed on a handle support tube and an extension support portion. Stop portions are connected to ends of the retention rod, for preventing the clamping plates from separating from the retention rod.

In accordance with another aspect of the invention, a transverse handle structure can be connected between a pair of extension handle portions. Preferably, the transverse handle structure is longitudinally adjustable. The adjustable transverse handle structure includes a first transverse telescopic member is connected to one of the pair of extension handle portions. A second transverse telescopic member is connected to the other of the pair of extension handle portions. The first transverse telescopic member is telescopically received in the second transverse telescopic member, and a lock nut assembly, supported on the second transverse telescopic member, for locking the first transverse telescopic member and the second transverse telescopic member in a set longitudinal adjustment.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved extension handle apparatus for a wheeled chair which has all of the advantages of the prior art and none of the disadvantages.

It is another object of the present invention to provide a new and improved extension handle apparatus for a wheeled chair which may be easily and efficiently manufactured and marketed.

It is a further object of the present invention to provide a new and improved extension handle apparatus for a wheeled chair which is of durable and reliable construction.

An even further object of the present invention is to provide a new and improved extension handle apparatus for a wheeled chair which is susceptible of a low cost of manufacture with regard to both materials and labor, and which accordingly is then susceptible of low prices of sale to the consuming public, thereby making such extension handle apparatus for a wheeled chair available to the buying public.

Still yet a further object of the present invention is to provide a new and improved extension handle apparatus for a wheeled chair which provides a handle that is adjustable to accommodate users having different heights and having different lengths of arms.

Still another object of the present invention is to provide a new and improved extension handle apparatus for a wheeled chair that provides a handle which is retractable and extensible.

Yet another object of the present invention is to provide a new and improved extension handle apparatus for a wheeled chair which provides a handle that can be retrofitted to a wheeled chair that does not have telescopic handles.

Even another object of the present invention is to provide a new and improved extension handle apparatus for a wheeled chair that provides a handle apparatus for retrofitting a wheeled chair that has independent handles to provide a horizontally adjustable transverse member connected between the independent handles.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
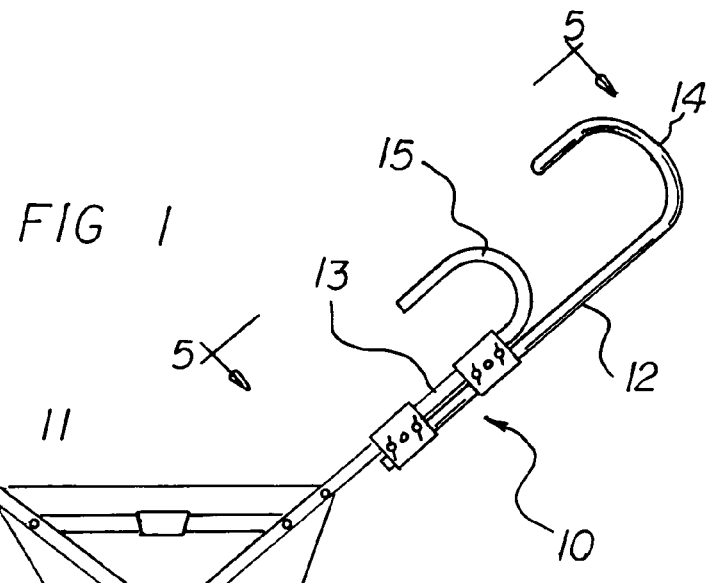
FIG. 1 is a side view showing a pair of first embodiments of extension handle apparatuses of the invention attached to a wheeled chair which is in the form of a baby stroller.
Figure 2:
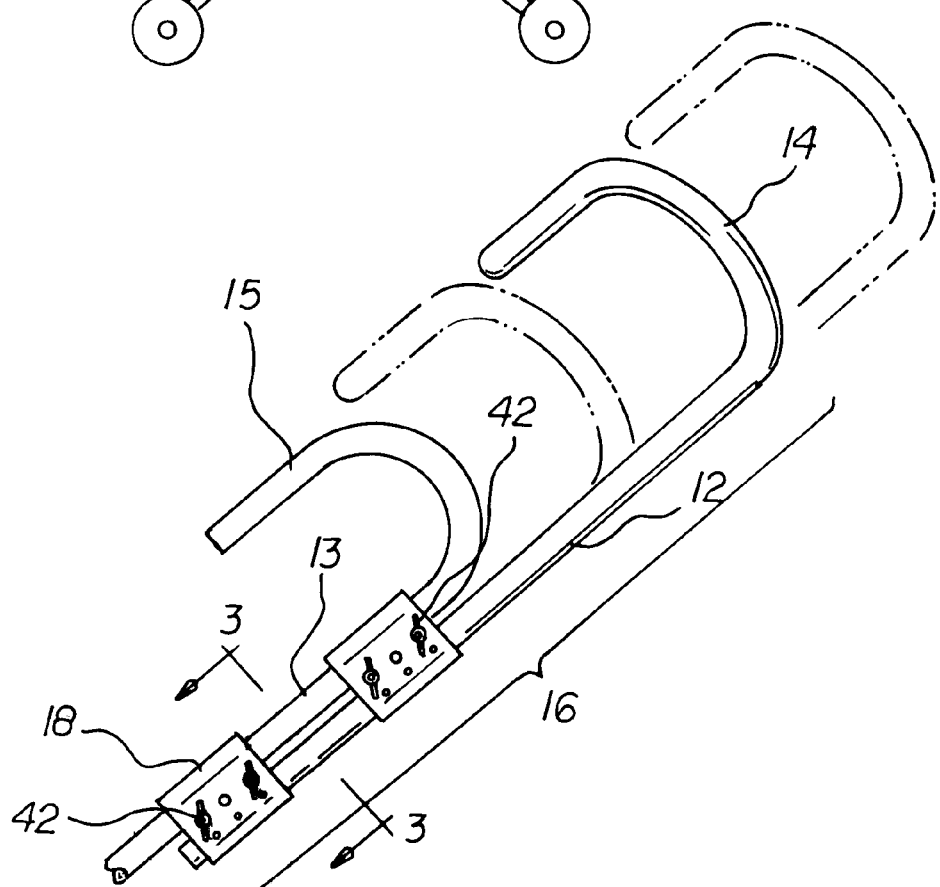
FIG. 2 is an enlarged side view of an embodiment of the extension handle apparatus shown in FIG. 1, in a number of adjusted extension positions along one of the support tubes for the handles of the wheeled chair.

With reference to the drawings, a new and improved extension handle apparatus for a wheeled chair embodying the principles and concepts of the present invention will be described.

Turning to FIGS. 1-5, there is shown a first embodiment of the extension handle apparatus for a wheeled chair of the invention generally designated by reference numeral 10. In the first embodiment, extension handle apparatus for a wheeled chair 10 is provided for a wheeled chair 11 which includes handle support tubes 13 for supporting one or more wheeled-chair handles 15. The extension handle apparatus 10 includes an extension support portion 12 and an extension handle portion 14 connected to the extension support portion 12. A pair of clamping plates 18 are provided, wherein each clamping plate 18 includes an extension-support reception region 20 and a wheeled-chair-handle-support-tube reception region 22. Clamping fasteners 24 are connected between the clamping plates 18, and a retention assembly 26 is connected between the clamping plates 18 for retaining the clamping plates 18 in opposite positions with respect to each other.

Preferably, the extension support portion 12 and the extension handle portion 14 are formed as a unified, integrated extension handle unit 16. Preferably, the clamping fasteners 24 include bolts 24 and wing nuts 42 connected to the bolts 24.

Preferably, each of the extension-support reception region 20 and the wheeled-chair-handle-support-tube reception region 22 has a concave contour for receiving a convexly shaped structure. Generally, the handle support tubes 13 and the extension support portions 12 are convexly shaped structures. Preferably, resilient liners 44 are located in the wheeled-chair-handle-support-tube reception regions 22 of the clamping plates 18. The resilient liners 44 can be made from rubber material. If desired, a permanent fastener 46 can be connected between one of the clamping plates 18 and the extension support portion 12. The permanent fastener 46 can be a rivet 46.

Preferably, the retention assembly 26 includes a retention rod 28 that is connected between the clamping plates 18. A bias spring 30 is supported by the retention rod 28 for maintaining the clamping plates 18 in opposite positions with respect to each other when the clamping plates 18 are not installed on a handle support tube 13 and an extension support portion 12. Stop portions 32 are connected to ends of the retention rod 28, for preventing the clamping plates 18 from separating from the retention rod 28.

Figure 3:
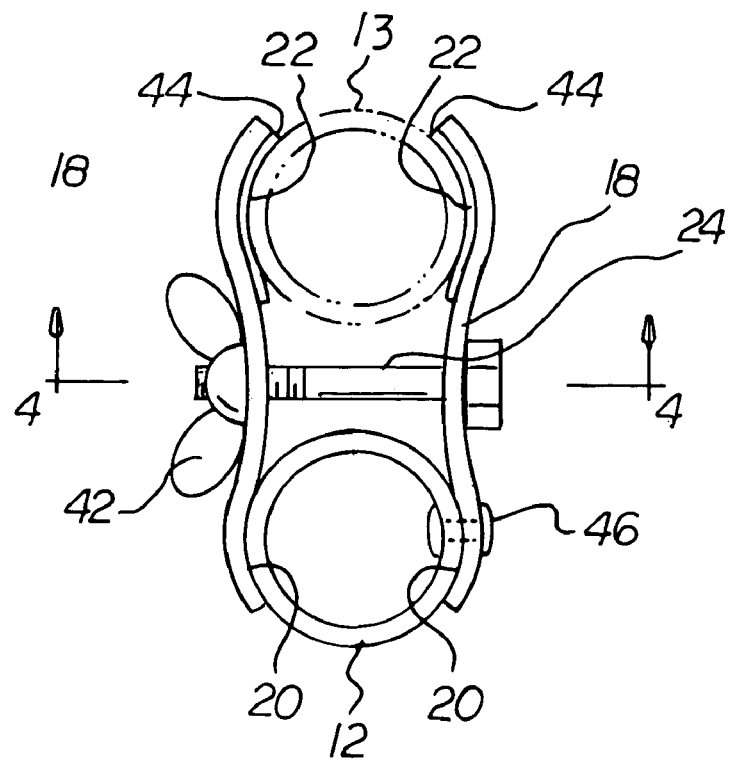
FIG. 3 is an enlarged cross-sectional view of the embodiment of the extension handle apparatus shown in FIG. 2 taken along line 3-3 thereof and removed from the support tube and the extension support portion of the extension handle unit of the invention.
Figure 4:
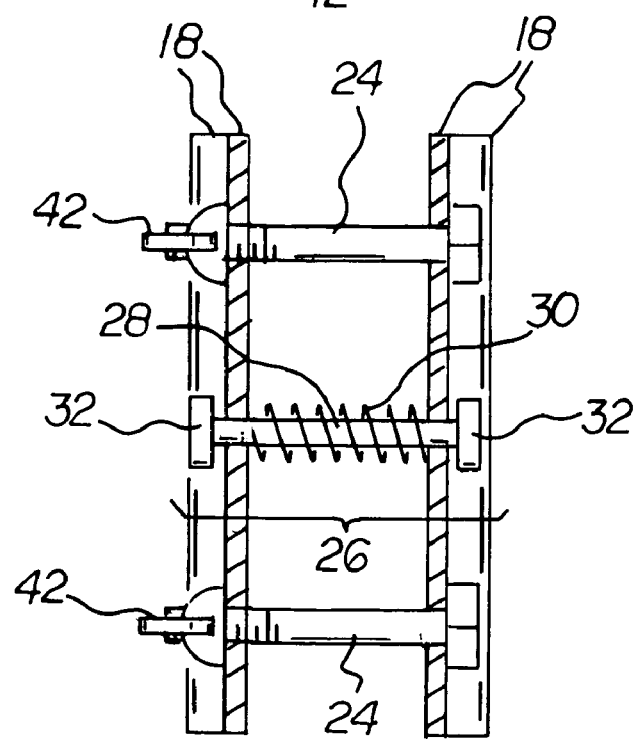
FIG. 4 is a cross-sectional view of the embodiment of the invention shown in FIG. 3 taken along line 4-4 thereof.
Figure 5:
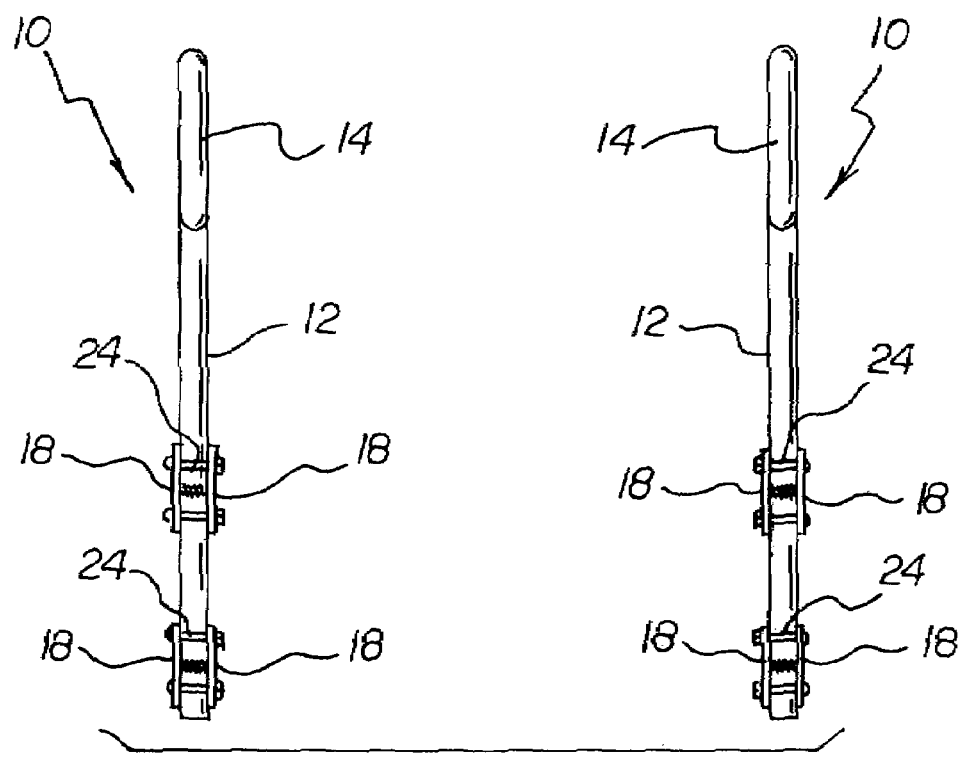
FIG. 5 is an enlarged top view of the pair of first embodiments of extension handle apparatuses of the invention of FIG. 1, taken along line 5-5 thereof, removed from the wheeled chair.

To use the first embodiment of the invention, preferably two pairs of clamping plates 18 are installed on the existing handle support tubes 13 of wheeled-chair handles 15 of a wheeled chair 11, as shown in FIGS. 1-5. More specifically, the wing nuts 42 are loosened so that the spacing between the pairs of opposed clamping plates 18 is made wide enough to receive the respective handle support tubes 13 and extension support portions 12 of the extension handle apparatus 10 of the invention. As shown in FIG. 3, the handle support tubes 13 are received in the wheeled-chair-handle-support-tube reception regions 22 of the clamping plates 18, and the extension support portions 12 are received in the extension-support reception regions 20 of the clamping plates 18. The wing nuts 42 are tightened so that the extension handle apparatus 10 of the invention can be adjusted longitudinally along the handle support tubes 13, as shown with the variety of adjustment positions shown in FIG. 2. As is clear from FIGS. 1 and 2, adjustment of the extension handle apparatus 10 of the invention along the handle support tubes 13 effectively lengthens the distance between the extension handle portions 14 of the extension handle apparatus 10, which a user grasps, and the wheeled chair 11. Once the desired adjustment positions of the extension handle apparatuses 10 are obtained, the wing nuts 42 are fully tightened to tightly clamp the apparatuses of the invention onto the handle support tubes 13 of the wheeled chair 11.

Figure 6:
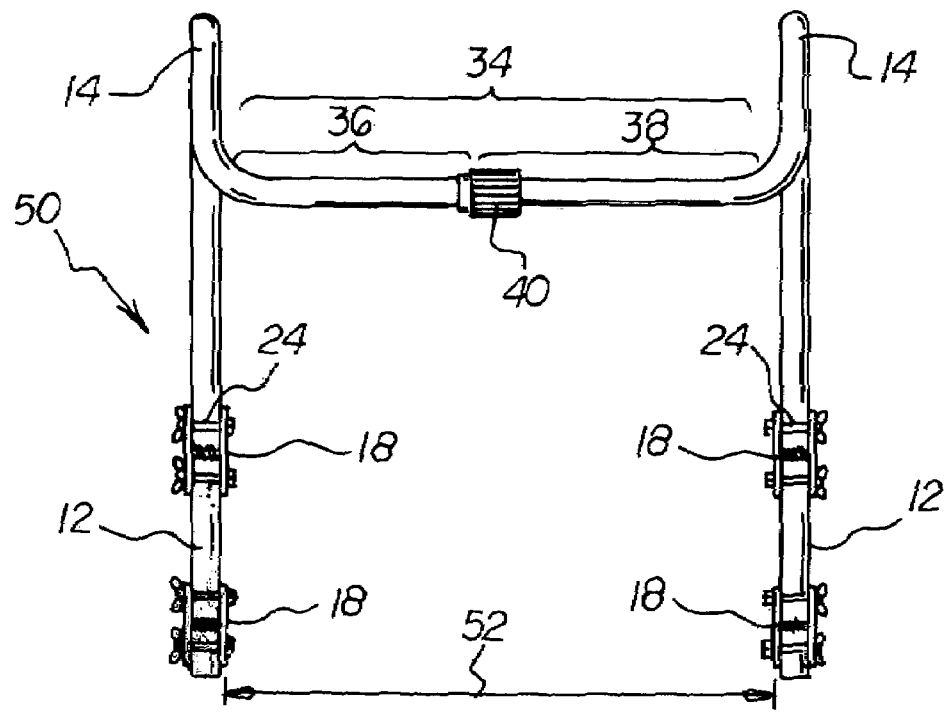
FIG. 6 is a top view of a second embodiment of the invention of an extension handle apparatus for a wheeled chair, wherein the second embodiment an adjustable transverse handle structure.

Turning to FIG. 6, a second embodiment 50 of the invention is shown. Reference numerals are shown that correspond to like reference numerals that designate like elements shown in the other figures. In addition, a transverse handle structure 34 is connected between a pair of extension handle portions 14. Preferably, the transverse handle structure 34 is longitudinally adjustable. The adjustable transverse handle structure 34 includes a first transverse telescopic member 36 is connected to one of the pair of extension handle portions 14. A second transverse telescopic member 38 is connected to the other of the pair of extension handle portions 14. The first transverse telescopic member 36 is telescopically received in the second transverse telescopic member 38, and a lock nut assembly 40, supported on the second transverse telescopic member 38, for locking the first transverse telescopic member 36 and the second transverse telescopic member 38 in a set longitudinal adjustment.

With a wheeled chair 11, the existing transverse distance 52 between pairs of handle support tubes 13 can vary from one wheeled chair 11 to another wheeled chair 11. The adjustable transverse handle structure 34 of the invention allows for adjustment of the second embodiment 50 of the invention to accommodate different transverse distances 52 between pairs of handle support tubes 13.

More specifically, the lock nut assembly 40 is loosened so that the first transverse telescopic member 36 can slide freely inside the second transverse telescopic member 38. Then, two pairs of the clamping plates 18 on one of the extension support portions 12 are attached to one of the handle support tubes 13, as described with the first embodiment. Then, the two pairs of the clamping plates 18 on the other extension support portion 12 are attached to the other handle support tube 13, also as described with respect to the first embodiment. Then, the lock nut assembly 40 is tightened to secure the effective transverse distance 52 of the adjustable transverse handle structure 34.

The components of the extension handle apparatus for a wheeled chair of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved extension handle apparatus for a wheeled chair that is low in cost, relatively simple in design and operation, and which may advantageously be used to provide a handle for a wheeled chair that is adjustable to accommodate users having different heights and having different lengths of arms. With the invention, an extension handle apparatus for a wheeled chair provides a handle which is retractable and extensible. With the invention, an extension handle apparatus for a wheeled chair provides a handle that can be retrofitted to a wheeled chair that does not have telescopic handles. With the invention, an extension handle apparatus for a wheeled chair provides a handle apparatus for retrofitting a wheeled chair that has independent handles to provide a horizontally adjustable transverse member connected between the independent handles.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. An extension handle apparatus for a wheeled chair which includes handle support tubes for supporting one or more wheeled-chair handles, comprising:
   an extension support portion,
   an extension handle portion connected to said extension support portion,
   a pair of clamping plates, wherein each clamping plate includes an extension-support reception region and a wheeled-chair-handle-support-tube reception region,
   first and second clamping fasteners connected between said clamping plates, and
   a retention assembly connected between said clamping plates for retaining said clamping plates in opposite positions with respect to each other,
   wherein said retention assembly includes:
   a retention rod connected between said clamping plates,
   a bias spring supported by said retention rod for maintaining said clamping plates in opposite positions with respect to each other, and
   stop portions, connected to ends of said retention rod, for preventing said clamping plates from separating from said retention rod, and
   wherein said pair of clamping plates has a longitudinal extent, said first and second clamping fasteners connected between said clamping plates being spaced from one another along said longitudinal extent, and
   wherein said retention assembly is disposed between said first and second clamping fasteners along said longitudinal extent such that said retention rod and said stop portions thereof prevent said clamping plates from separating from said retention rod when said first and second fasteners are loosened relative to said pair of clamping plates,
   and wherein each one of said pair of clamping plates includes a first concave portion for defining said extension-support reception region and a second concave portion for defining said wheeled-chair-handle-support tube reception region, and wherein said longitudinally spaced first and second clamping fasteners and said retention rod of said retention assembly therebetween are located intermedially between said first concave portion and said second concave portion of each one of said pair of clamping plates.

2. The apparatus of claim 1 wherein said extension support portion and said extension handle portion are formed as a unified, integrated extension handle unit.

3. The apparatus of claim 1 wherein said clamping fasteners include bolts and wing nuts connected to said bolts.

4. The apparatus of claim 1 wherein each of said extension-support reception region and said wheeled-chair-handle-support-tube reception region has a concave contour for receiving a convexly shaped structure.

5. The apparatus of claim 4, further including:
   resilient liners located in said wheeled-chair-handle-support-tube reception region.

6. The apparatus of claim 1, further including:
   a permanent fastener connected between one of said clamping plates and said extension support portion.

7. The apparatus of claim 1, further including:
   a transverse handle structure connected between a pair of extension handle portions.

8. The apparatus of claim 7 wherein said transverse handle structure is adjustable.

9. The apparatus of claim 8 wherein said adjustable transverse handle structure includes:
   a first transverse telescopic member connected to one of said pair of extension handle portions,
   a second transverse telescopic member connected to the other of said pair of extension handle portions, wherein said first transverse telescopic member is telescopically received in said second transverse telescopic member, and
   a lock nut assembly, supported on said second transverse telescopic member, for locking said first transverse telescopic member and said second transverse telescopic member in a set longitudinal adjustment.

* * * * *